United States Patent [19]

Csorsz

[11] Patent Number: 4,571,667
[45] Date of Patent: Feb. 18, 1986

[54] MULTIPHASE AC-DC RESONANT CASCADE POWER CONVERTER

[76] Inventor: Alex E. Csorsz, 585 Amy La., Idaho Falls, Id. 83401

[21] Appl. No.: 828,331

[22] Filed: Aug. 29, 1977

[51] Int. Cl.⁴ .............................................. H02H 7/00
[52] U.S. Cl. .................................................... 363/51
[58] Field of Search ....................... 363/35, 39, 44–48, 363/51, 59–62, 126, 129, 137

[56] References Cited

U.S. PATENT DOCUMENTS

| | | | |
|---|---|---|---|
| 2,214,871 | 9/1940 | Westendorp | 363/59 |
| 3,320,513 | 5/1967 | Cleland | 363/61 |
| 3,513,376 | 5/1970 | Hajek | 363/62 |
| 3,543,136 | 11/1970 | Enge | 363/61 |
| 3,596,167 | 7/1971 | Enge | 363/61 |

FOREIGN PATENT DOCUMENTS 1130082 10/1968 United Kingdom ................. 363/59

Primary Examiner—William M. Shoop, Jr.

[57] ABSTRACT

A resonant cascade power converter includes a plurality of phase legs. Each phase leg contains a plurality of resonant circuits arranged in cascade, whereby at least one variable of AC excitation in each phase leg is substantially common for all resonant circuits of that phase leg.

8 Claims, 7 Drawing Figures

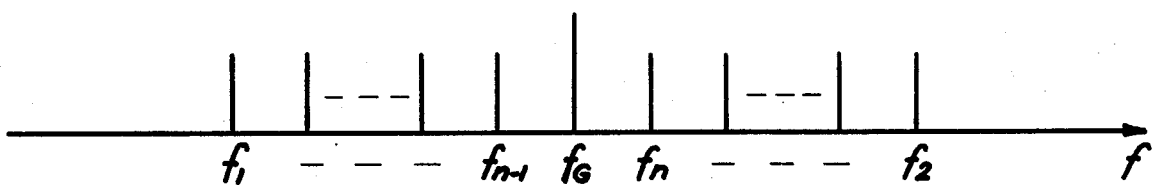
FIG. 3.
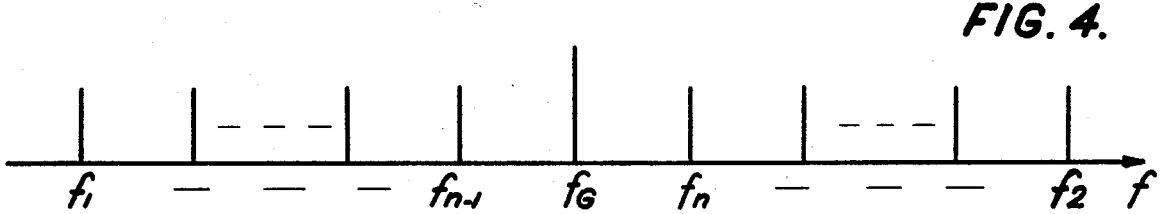
FIG. 4.
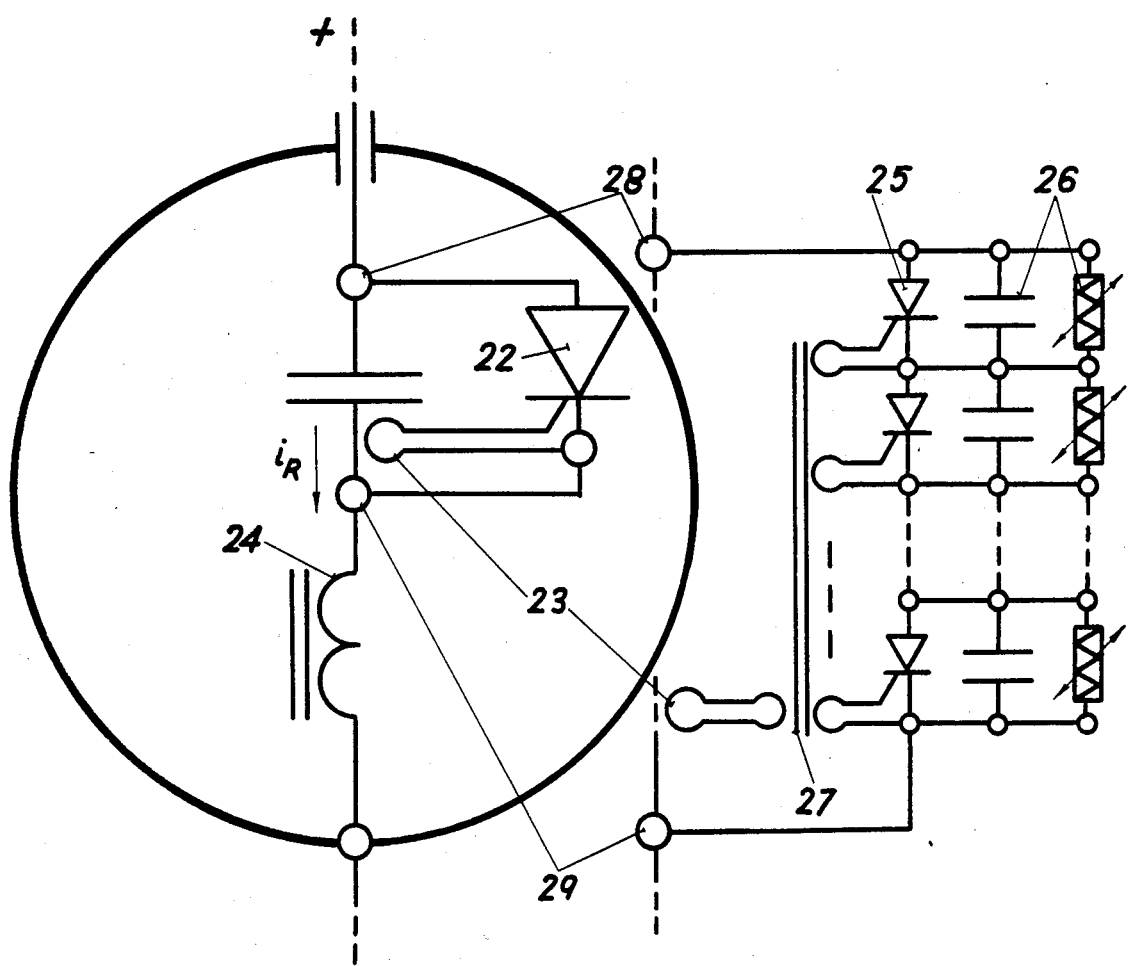
FIG. 5.
FIG. 6.

MULTIPHASE AC-DC RESONANT CASCADE POWER CONVERTER

SUMMARY OF INVENTION

PURPOSE: Efficient electromagnetic AC power transmission between Converter Units high voltage DC cascaded.

CONSTRUCTION: Alternating electric current or magnetic flux transmits AC power between series or parallel resonant circuits of Converter Units. Resonant frequencies may be controlled to optimize performances at any load conditions.

Mass producible Converter Units lower cost.

Modular design means simplicity, versatility, and high efficiency of power conversion for most any industrial or scientific applications, including both terminals of High Voltage DC Power Transmission Systems, and Particle Accelerators.

DRAWINGS

Figure 1:
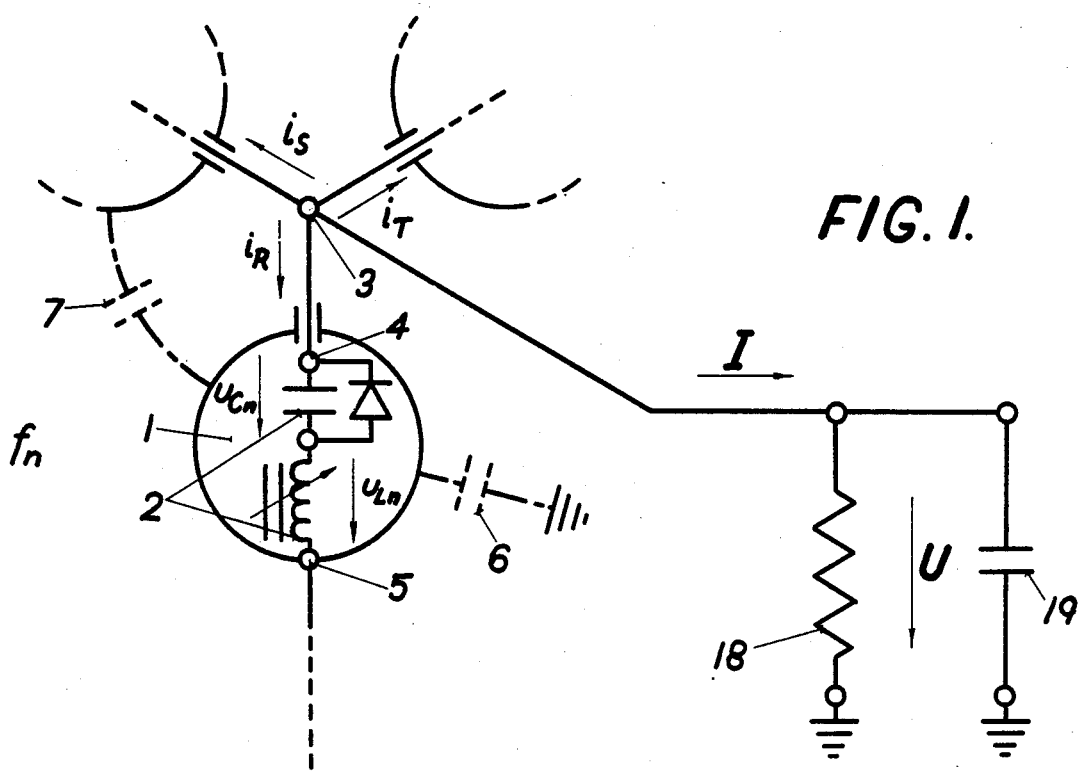

FIG. 1: Three phase Series Resonant AC-DC Cascade Power Converter. Phase leg "R" is detailed only.

Figure 2:
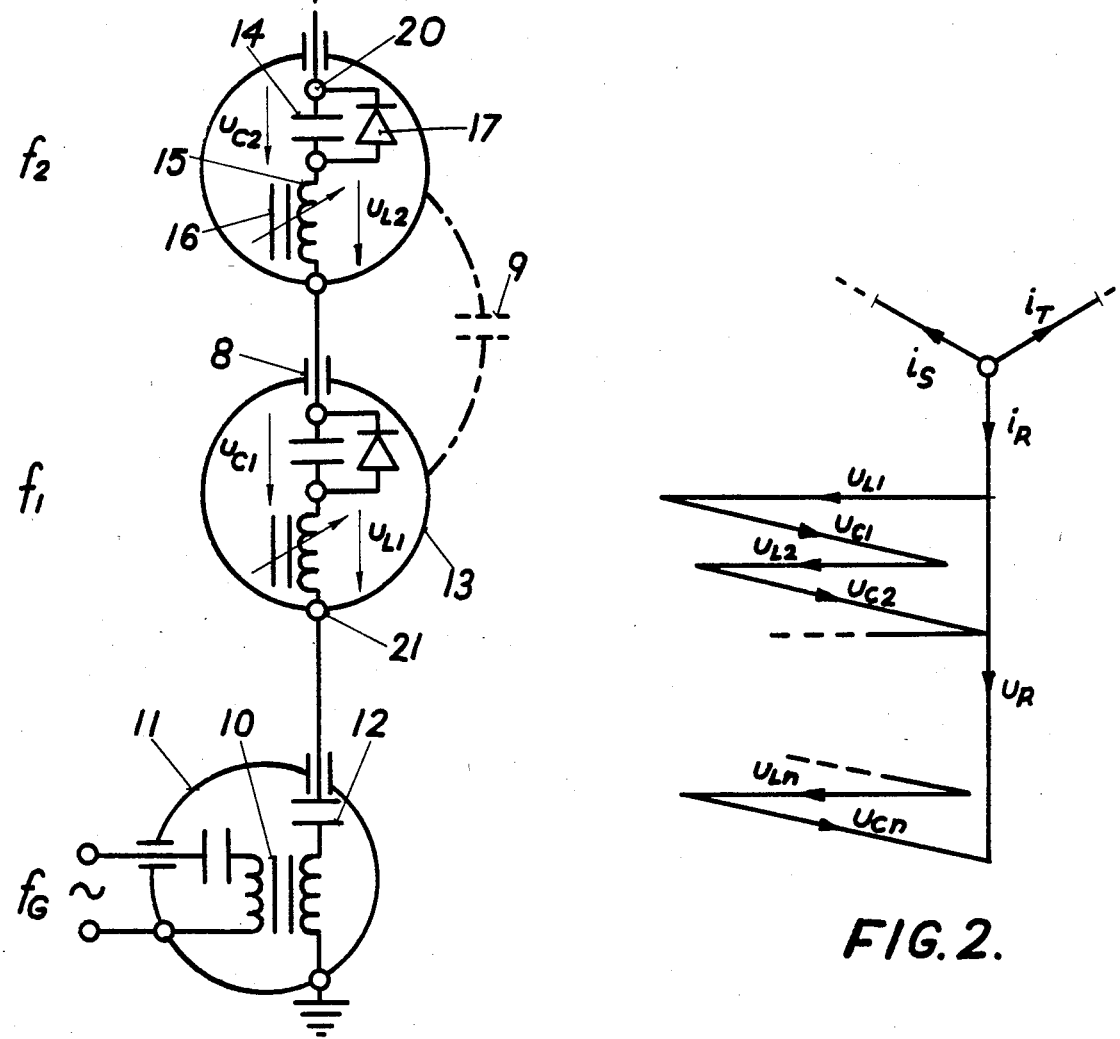

FIG. 2: Vector diagram of a Series Resonant phase leg.

FIG. 3: Resonant frequency spectrum of Converter Units at light load.

FIG. 4: Resonant frequency spectrum of Converter Units at heavy load.

FIG. 5: Series Resonant Converter Unit for DC-AC conversion.

FIG. 6: High voltage SCR assembly for DC-AC Converter Unit.

Figure 7:
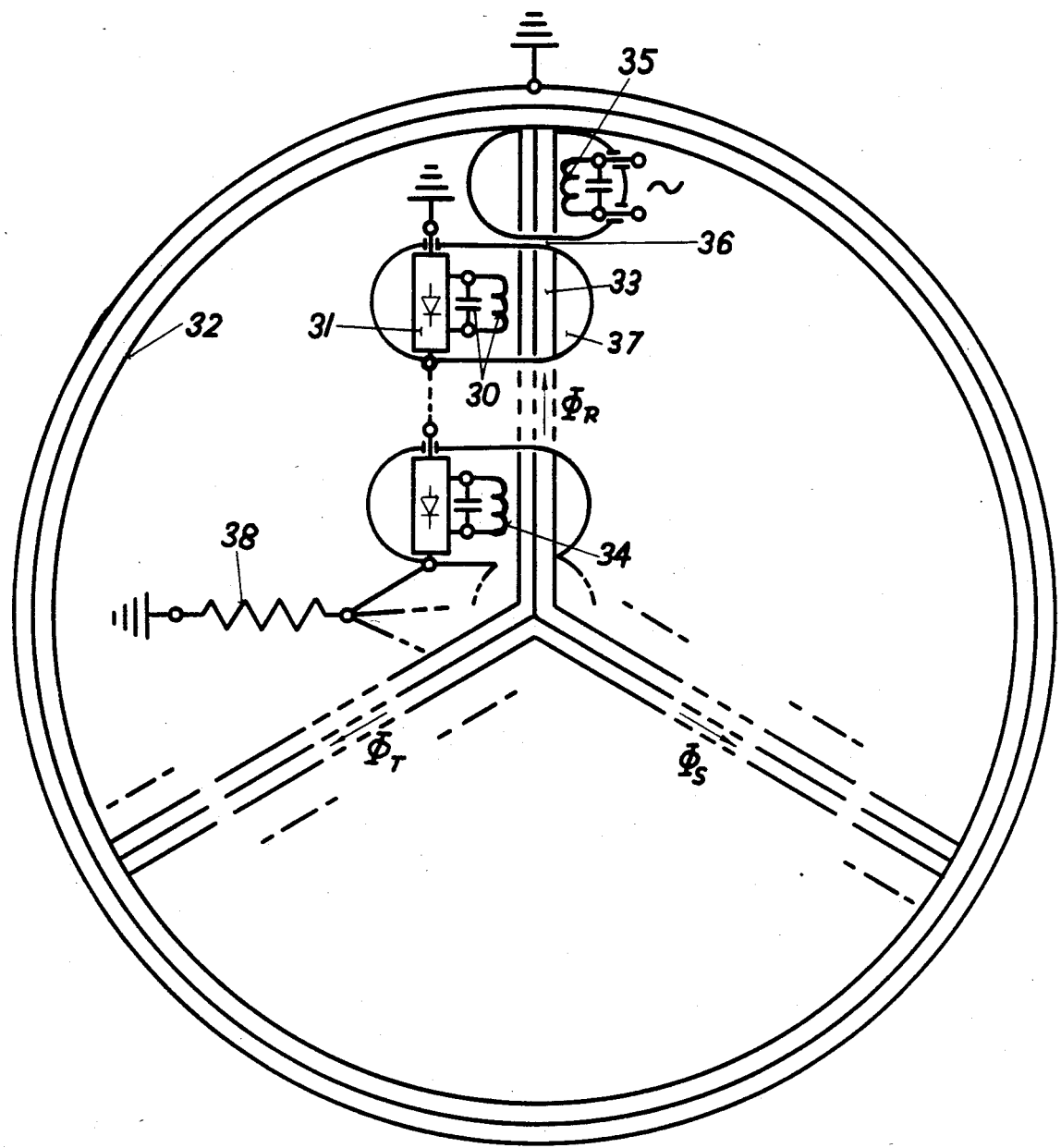

FIG. 7: Three phase Parallel Resonant Cascade Power Converter. Phase leg "R" is detailed only.

PREFERRED AC-DC CONVERTER

Series resonant design is recommended for most applications.

FIG. 1 illustrates one phase leg of a three phase AC-DC Power Converter. A typical Converter Unit, 1, is built around a series resonant circuit, 2. The energizing alternating currents, $i_R$, $i_S$, and $i_T$ are substantially balanced at the common star point, 3, if phase symmetry is reasonably maintained. Any one of these currents, as a variable of AC excitation is substantially common for a phase leg. Thus it is common for all Converter Units, 1, with DC terminals, like 4 and 5, connected in series, if stray capacitances, like 6 and 7 do not carry considerable shunt alternating electric currents.

Stray capacitances of Converter Units to the ground, like 6, and those to other phase legs, like 7, may put a limit on increasing the number of Units of a phase leg. The stray capacitances can be minimized, and increasing capacitance values along the phase leg will experience successively decreasing alternating voltage differences that shall ease up this limitation.

Stray capacitances between adjacent Converter Units of the same phase leg, and capacitances of the bushing insulator, 8, are connected parallel, and symbolized by capacitor 9 for a given pair of Units. This capacitor 9 of a considerable value will experience an alternating voltage difference of $u_{L1} - u_{C1}$ only, so as it shall not create any considerable bypass current to $i_R$. See illustrations of vector diagram on FIG. 2 described later.

Each phase leg is energized by a transformer, 10, driven by an $f_G$ frequency AC power source at the proper phase, R, S, T, respectively. This AC power source, not shown, shall be turned on with gradually increasing intensity to avoid harmful transient operations of the Converter, and it shall be controlled to provide the desired DC output. The transformer, 10, may have pot core to reduce stray magnetic fields. It may have optional resonant circuits. An example of series resonant circuits is shown that may incorporate another option: Condenser 12 could be bypassed by a rectifier diode that might allow the Energizer Unit in enclosure 11 to function as a Converter Unit also.

In the sample construction of FIG. 1 the transformer and its accessories are located in a grounded metal enclosure, 11, preferably filled with insulating oil, and well rounded to minimize electrostatic fields on its surface. This surface has to dissipate all heat losses generated within the enclosure unless provisions are made to circulate the oil through a cooling system.

AC-DC conversion shall take place in Converter Units. On FIG. 1 these Units are encapsulated in meatal enclosures, 13, built and filled like 11. Bushing insulator 8 shall experience fluctuating DC voltages.

The series resonant circuit of a typical Converter Unit consists of a condenser, 14, and a coil, 15. Induction value of this coil may be variable to realize controlled resonant frequency spectrum of Converter Units described later. Core 16 may be optional pot core to minimize stray magnetic fields.

The condenser is bypassed by rectifier diode 17. It may be an assembly of series connected semiconductor diodes with reverse voltage distribution homogenizing condenser-voltage dependent resistor circuits, similar to that suggested for SCR's, 26 on FIG. 6. These circuits shall protect the diodes from reverse overvoltage. The maximum reverse voltage rating of diode assembly 17 shall determine the maximum DC voltage step-up of a Converter Unit, $U_i$. Index "i" refers to any Converter Unit, so it may be an integer from 1 to n, if n is the number of Converter Units in a phase leg. The orientation of diode 17 shall determine the polarity of DC output voltage of the Converter, U, on the load symbolized by resistor 18 and condenser 19. The example of FIG. 1 shows an output voltage positive versus ground. This DC output voltage may be calculated as follows:

$$U = \sum_{i=1}^{n} U_i$$

$U_i$ may be measured on terminals like 4 and 5,.

Undulances of U can be determined by circuit analysis of the actual AC energizer-control-Converter-DC load system. These undulances can be decreased by increasing the number of phase legs, and/or arranging the resonant frequencies of Converter Units of each phase leg according to FIG. 3. See left side of FIG. 1 for locations of Units with a given resonant frequency. Units located, hence coupled closest to the AC power source of $f_G$ frequency excitation, and bypassed by the least stray capacitances, are tuned to frequencies $f_1$ and $f_2$ shown farthermost from $f_G$ on FIG. 3. This frequency arrangement shall result in the largest plus and minus phase differences in the charging forward current pulses through the rectifier diodes of Converter Units #1 and #2 throughout this phase leg. Deviation of $f_1$ and $f_2$ from $f_G$ may be symmetrical so as the total combined reactances of Converter Units #1 and #2 between terminals 20 and 21 may be balanced close to zero. This will justify the adjacent location of Units with resonant frequencies of $f_1$ and $f_2$, although these two Units do not necessarily need to be located adjacent if other reasons prevail. The same may be true for any other pairs of resonant frequencies, like $f_n$ and $f_{n-1}$, according to FIG. 3. Automatic controls constantly ensuring this balance shall be suggested below. Such controls may be utilized for the entire phase leg, or for any part of it. Phase legs may contain either even or odd number of Converter Units.

With increasing DC load, I, undulances of U tend to increase. Aforementioned compensating Unit resonant frequency tune off can be intensified, too, as shown on FIG. 4. This may be realized by automatic controls of resonant frequencies as follows:

Inductance of typical coil 15, hence the resonant frequency of the given Converter Unit may be controlled by DC load conditions. "I" can decrease the inductance of every odd "i" numbered coil directly through DC premagnetization of the corresponding core, 16. At the same time, the decrease of an independent DC counter-magnetization bias through increasing "I" may increase the inductance of every coil with even "i" indices. These two control actions may maintain a reasonable good approximation of resonant frequency controls shown on FIGS. 3 and 4. Remember that these resonant frequency controls slightly alter the features of the coil, 15, and the core, 16, only. Thus the massproducibility of all Converter Units is still closely maintained even for those designs where resonant frequency control is used.

AC-DC Power converter opertions can be reviewed on the vector diagram of FIG. 2: Phase leg "R" detailed here is energized by $\vec{i}_R$ alternating current of $f_G$ frequency. This current shall generate $\vec{u}_{Li}$ and $\vec{u}_{Ci}$ alternating voltages on the coils, 15, and condensers, 14, of Converter Units "i", respectively. The total alternating voltage drop, $\vec{u}_{L1}+\vec{u}_{C1}+\vec{u}_{L2}+\vec{u}_{C2}$, through a balanced pair of Converter Units #1 and #2, is in phase with $i_R$. The total alternating voltage drop through the entire phase leg, $\vec{u}_R$, is also in phase with $\vec{i}_R$. Vector diagrams of the other two phase legs are indicated by the symbols of energizing alternating currents, $\vec{i}_S$ and $\vec{i}_T$ only.

PREFERRED DC-AC CONVERTER

The converter construction described above can be used also for DC-AC power conversion with Units, 1, modified according to FIG. 5: Diode assembly 17 is replaced by SCR, 22, triggered by increasing negative values of $di_R/dt$. A symbolic $di_R/dt$ sensor loop is shown, 23, but practically the triggering voltage may be obtained from the first turns of the coil, 24, at its upper end. This coil may not necessarily have the optional changing inductance controlled by load conditions as described before for resonant frequency controls. If all the DC-AC Converter Units have resonant frequencies, $f_G$, identical with each other and with that of the resonant transformer, 10, driving a phase of the AC load, a central SCR firing signal common for the entire phase leg can be generated and transmitted by special carrier frequency impulse. In this case the fluctuation of the load current from the DC power source may be heavy. Suggested for DC power sources with large output capacitance only, and/or for higher number of phase legs of DC-AC Power Convertor.

To meet reasonably high reverse voltage requirements, the SCR, 22, is realized by a series assembly of SCR thyristors, 25, with condenser-voltage dependent resistor circuits, 26, to ensure uniform reverse voltage distribution. A triggering signal identical for all SCR's of an assembly, 25, may be distributed by pulse transformer 27. This entire assembly of the FIG. 6 may be connected between terminals 28 and 29 of FIG. 5 to replace the SCR, 22.

The frequency, voltage, and power ranges covered by these twin AC-DC and DC-AC Power Converters are limited merely by the components available, by the control over stray capacitances, by the feasibility of high voltage construction, and by other design problems, like systems stability.

ALTERNATIVE CONSTRUCTIONS

The variable of AC excitation substantially common for each phase leg, hence for all Units of Resonant Circuits, was an alternating electric current, like $i_R$, in every construction detailed above.

This variable can be an alternatimg magnetic flux, or any combination of magnetic flux and electric current.

A construction using common alternating magnetic flux, $\Phi_R$ in phase leg "R", and parallel resonant circuits, 30, for three phase operations is outlined on FIG. 7. These resonant circuits may be coupled to any kind of rectifier or SCR circuits, 31, conected in DC cascade to provide AC-DC or DC-AC power conversion.

The alternating magnetic flux is maintained in a three phase closed ferromagnetic core system, 32, divided into electrically insulated segments, 33, at the phase legs, to allow reasonably low voltage differences between each ferromagnetic core segment, and the coil, 34, wound on it.

In analogy to power transformer 10 of Energizer Unit 11, FIG. 1, a parallel resonant power transformer 35 is employed here.

Gap 36 between core segments, like 33, maintained by ceramic or other electric insulators, not detailed here, will generate stray alternating magnetic fluxes. These stray fluxes may be minimized by enlarging and concave/convex shaping of the matching magnetic core surfaces. This stray phenomena may pose a limitation on the number of Converter Units, 37, connected in series with reasonable efficiency. Considerations on strayed magnetic fluxes are analogous to those on stray capacitances described before.

All considerations on resonant frequency spectrum control are also applicable here.

Magnetic forces generating mechanical vibrations around gaps like 36 may pose extra difficulties on the integrity of this construction.

REFERENCES

U.S. Pat. Nos.
2,214,871, 9/1940, Westendorp, 321-15,
3,259,830, 7/1956, Ojelid, 321-15,
3,513,376, 5/1970, Hajek, 321-15,
3,543,136, 11/1970, Enge, 321-15,
3,596,167, 7/1971, Enge, 321-15.
What I claim is:

1. RESONANT CASCADE POWER CONVERTER comprising a plurality of Phase Legs, each Phase Leg containing a plurality of Resonant Circuits arranged in cascade so that at least one Variable of AC Excitation in each Phase Leg is substantially common for all Resonant Circuits of that Phase Leg.

2. The CONVERTER according to claim 1 wherein said Variable of AC Excitation is substantially balanced at the commmon point of said Phase Legs by multiphase operations.

3. The CONVERTER according to claim 1 wherein said variable of AC Excitation is alternating electric current.

4. The CONVERTER according to claim 1 wherein said Variable of AC Excitation is alternating magnetic flux.

5. The CONVERTER according to claim 1 wherein at least two of said Resonant Circuits of a Phase Leg have Resonant Frequencies substantially different from each other so as to have their combined total reactances balanced with respect to each other.

6. The CONVERTER according to claim 5 wherein said Resonant Frequency of at least two Resonant Circuits are controlled by load conditions of said Cascade Converter.

7. The CONVERTER according to claims 1 through 6 wherein multiphase AC input power is converted into high voltage DC output power by means of rectifier circuits combined with said Resonant Circuits.

8. The CONVERTER according to any one of claims 1 through 6 wherein high voltage DC input power is converted into multiphase AC output power by means of trigger controlled switching circuits combined with said Resonant Circuits.

* * * * *